United States Patent [19]

Westover et al.

[11] Patent Number: 4,707,917
[45] Date of Patent: Nov. 24, 1987

[54] METHODS AND APPARATUS FOR CUTTING ROD-LIKE OBJECTS

[76] Inventors: Dwight G. Westover, 461 W. Orange Grove Ave., Sierra Madre, Calif. 91024; Raymond M. McManaman, 1235 E. Comstock, Glendora, Calif. 91740

[21] Appl. No.: 821,894

[22] Filed: Jan. 23, 1986

[51] Int. Cl.[4] ............................................. B26B 17/00
[52] U.S. Cl. ........................................ 30/182; 30/241
[58] Field of Search ................................. 30/182–185, 30/231, 241–243

[56] References Cited

U.S. PATENT DOCUMENTS 1,092,954 4/1914 Scott ..................................... 30/242
2,165,209 7/1939 Baldanza ........................... 30/182 X Primary Examiner—Douglas D. Watts
Attorney, Agent, or Firm—Benoit Law Corporation

[57] ABSTRACT

Objects are received between first and second cutting elements of a cutter, which is suspended via the first cutting element from a rod-like object to be cut. The first cutting element, which preferably is formed as a cutter suspension including a cutting blade, is moved into the rod-like object toward the second element, until that object has been cut. The cutter preferably is mounted on an elongate handle, and rotary motion of such handle is translated into movement of the cutting elements toward each other. A quick release mechanism permits quick release action of the second element and an elongate member permits holding of the first cutting element onto the object, while the second element is pushed with the elongate handle toward the object.

23 Claims, 8 Drawing Figures

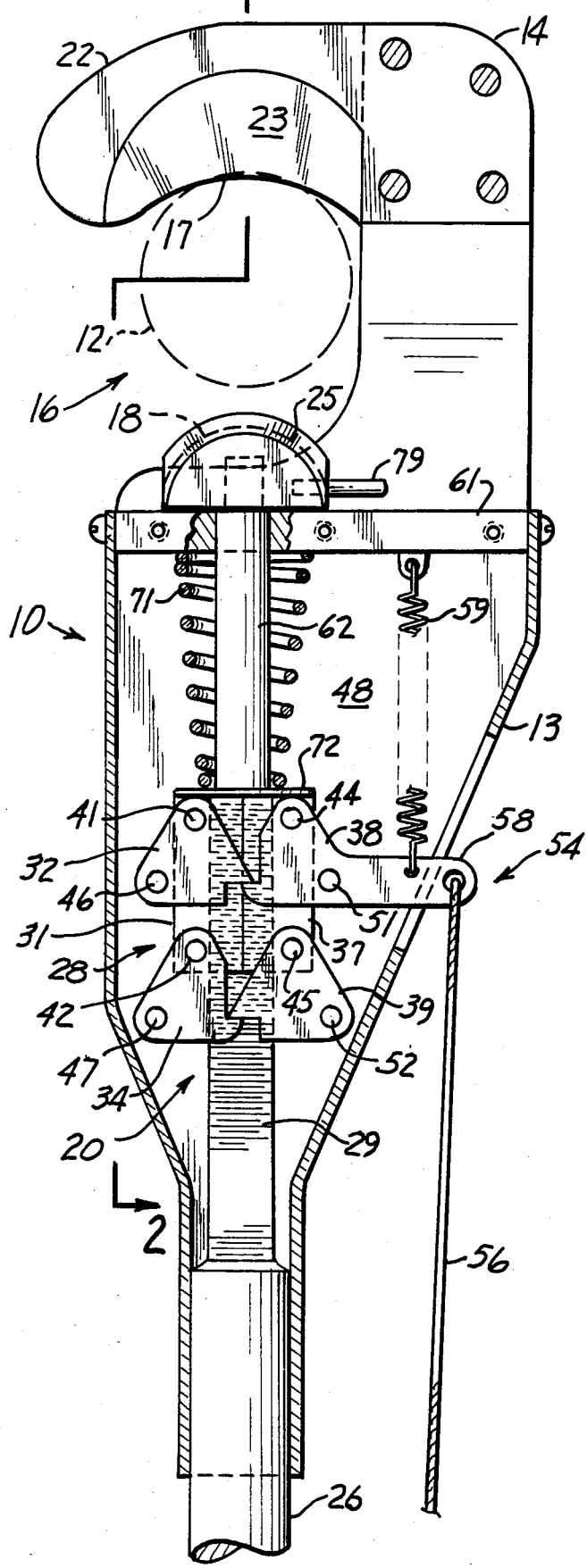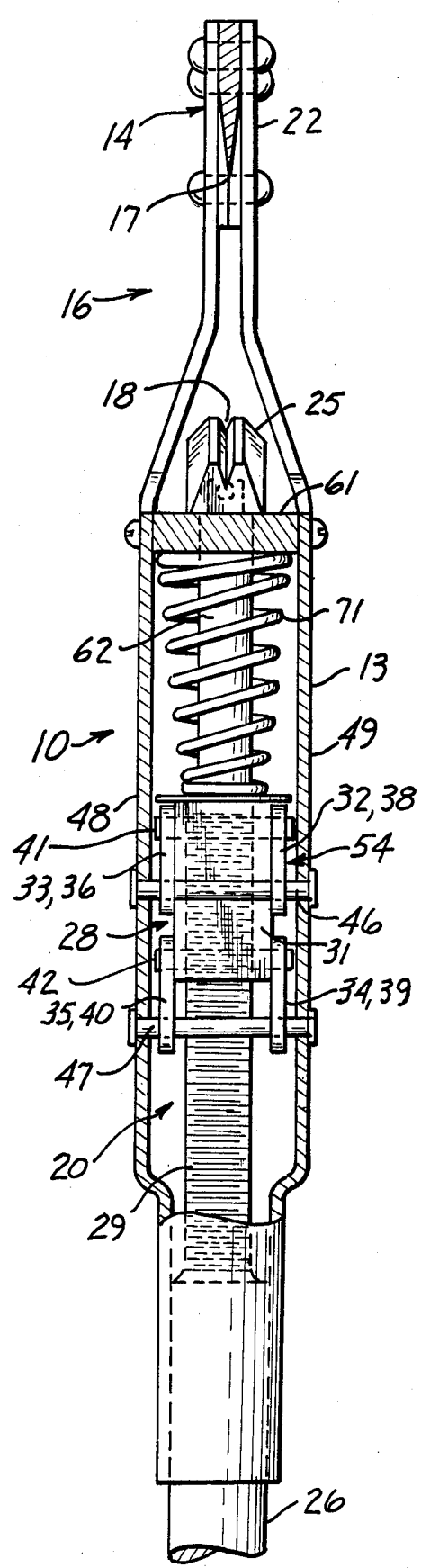

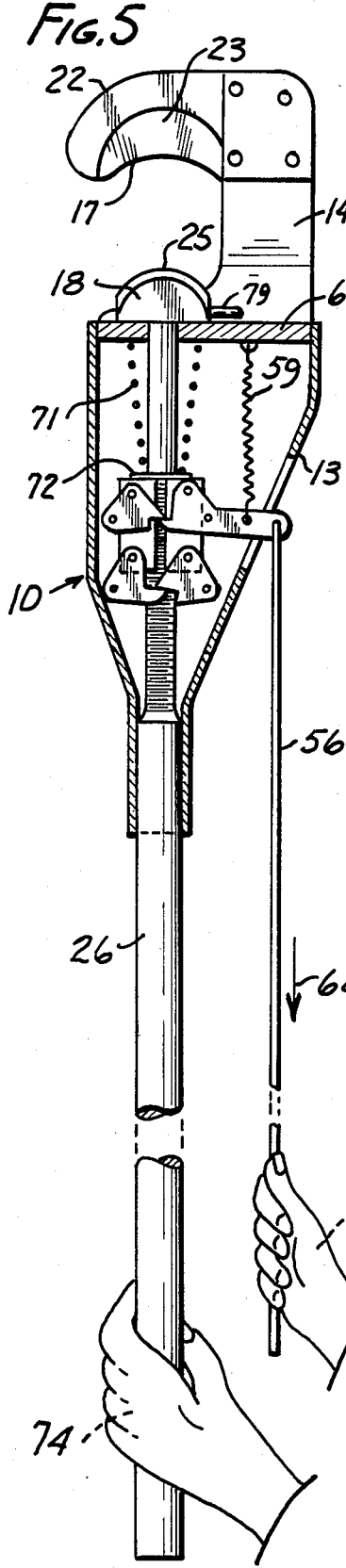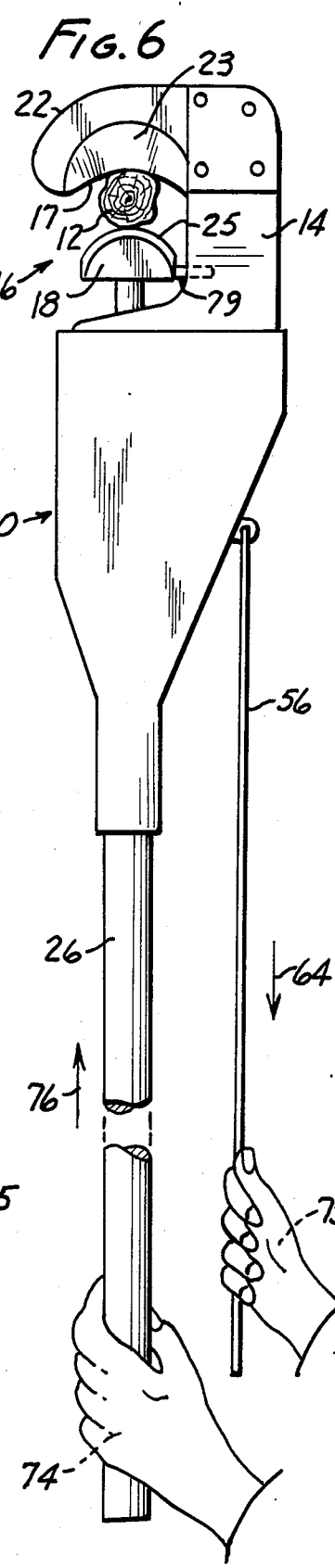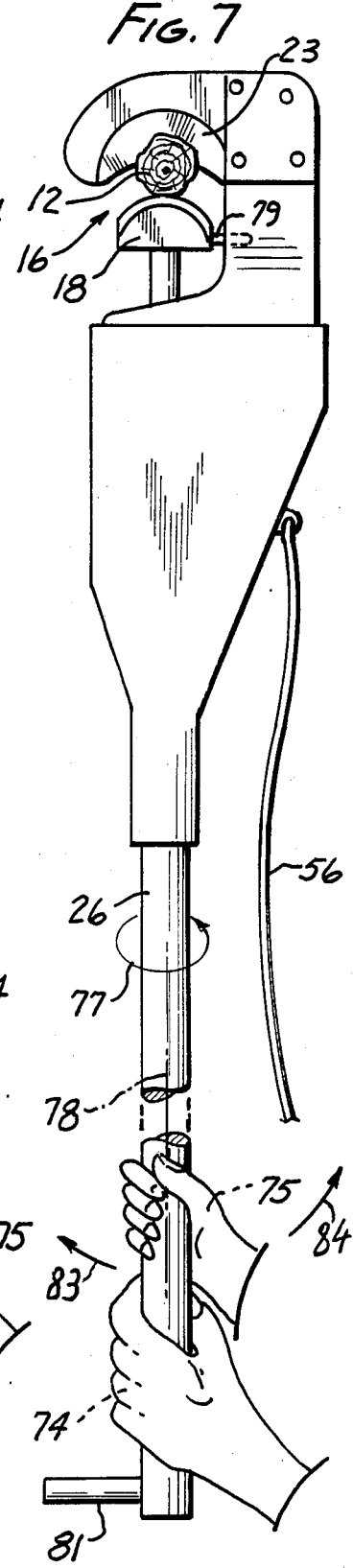

METHODS AND APPARATUS FOR CUTTING ROD-LIKE OBJECTS

BACKGROUND OF THE INVENTION

1. Field of the Invention

The subject invention relates to systems for cutting objects and, more specifically, to methods and apparatus for cutting tree branches and other rod-like objects from the ground with relatively movable cutting elements.

2. Information Disclosure Statement

Methods and apparatus for cutting objects have been proposed for centuries. A familiar example is the cutting of tree limbs or branches, where a need for new methods and apparatus still is very strong, especially with respect to branches located above the reach of a human being from the ground.

In that case, the person doing the cutting can try to climb the tree for that purpose, which may, however, be dangerous. A more safer approach is to use a ladder. This may, however, also be dangerous, especially if the roots of the tree, often unbeknownst to the person doing the cutting, are shallow, so that the tree will fall over under the weight of the ladder and the person thereon. Also, extension ladders are often necessary, which are not available in many households.

Portable chain saws are expensive, require continual maintenance and are also dangerous especially to the inexperienced user and particularly when carried into a tree, where the footing may not always be adequate to that purpose. Also, the natural sway of branches often resists effective cutting thereof especially at locations spaced from their crutch.

The same applies to a device that uses a chain which is thrown over the branch and is then moved back and forth from the ground, in an effort to cut through the branch. In addition, throwing a chain over a branch from a distance is frequently difficult, if not practically impossible, and may expose users to injury from falling chains.

Other existing cutting devices use pruning shears, sometimes on a pole, with an actuating string. Some of these have a ratchet device which, however, interfers with a backing up with the cutting operation. Also, where the cutting blade is at the bottom of the device, the branch being cut pinches the blade when gravity deflects that branch, whereby the cutter is rendered ineffective.

SUMMARY OF THE INVENTION

It is a general object of this invention to overcome the disadvantages and to meet the needs expressed or implicit in the Information Disclosure Statement or in other parts hereof.

It is a germane object of this invention to provide improved methods and apparatus for cutting tree branches, limbs and other rod-like objects, preferably at a distance from the ground exceeding the stretch of a human being.

It is a related object of this invention to avoid the danger of prior-art cutting methods and apparatus.

It is also an object of this invention to provide a new kind of cutting tool.

Other objects of this invention will become apparent in the further course of this disclosure.

From a first aspect thereof, the subject invention resides in a method comprising, in combination, the steps of providing a cutter including a first cutting element formed as a hook for suspending the cutter from the object and a second element complementing the first cutting element for cutting said object, mounting the cutter on an elongate handle, providing the second element with a selectively actuable quick release action relative to the first cutting element, providing an elongate member for actuating the quick release action of the second element and for holding the first cutting element onto the object, while the second element is pushed with the handle toward the object, receiving said object between said first and second elements and suspending the cutter from said object with the hook and effecting the pushing of the second element toward the object, rotating the handle about a longitudinal axis thereof, translating rotary motion of the handle into movement of the first and second cutting elements toward each other, and moving the hook into said object suspending the cutter and toward the second element until said object has been cut.

From a related aspect thereof, the subject invention resides in apparatus for cutting a rod-like object, comprising, in combination, means for suspending the apparatus from said object, cutting means including a first cutting element combined with the suspending means, a second element complementing the first element for cutting said object, means for mounting the first and second elements relative to each other for a reception of said object therebetween, an elongate handle for supporting the cutting means, the cutting means including means connected to the first and second elements for mounting the handle for rotation about a longitudinal axis thereof, and means at the handle for translating rotary motion of the handle into movement of the first cutting element into said object and toward the second element until said object has been cut, and a selectively actuable quick release mechanism for selectively releasing the second element relative to said first cutting element, including means for releasing the means for translating rotary motion and means for rendering the handle translatorily movable along the longitudinal axis relative to the released translating means, whereby the handle and the second element are manually movable along the longitudinal axis without rotation of the handle.

From another related aspect thereof, the subject invention resides in apparatus for cutting a rod-like object, comprising, in combination, a hook for suspending the apparatus from said object, cutting means including a first cutting element incorporated in the hook, a second element complementing the first element for cutting said object, means for mounting the first and second elements relative to each other for a reception of said object therebetween, an elongate handle for supporting the cutter, the cutting means including means connected to the first and second elements for mounting the handle for rotation about a longitudinal axis thereof, and means at the handle for translating rotary motion of the handle into movement of the first cutting element incorporated in the hook into said object and toward the second element until said object has been cut, and a selectively actuable quick release mechanism for selectively releasing the second element relative to the first cutting element, including means for releasing the means for translating rotary motion and means for rendering the handle translatorily movable along the longitudinal axis relative to the released translating means, whereby the handle and the second element are manually movable along the longitudinal axis without rotation of the handle.

Other aspects of the invention will become apparent during the further course of this disclosure and no restriction whatever is intended by the subject Summary of the Invention.

BRIEF DESCRIPTION OF THE DRAWINGS

The subject invention and its various aspects and objects will become more readily apparent from the following detailed description of preferred embodiments thereof, illustrated by way of example in the accompanying drawings, in which like reference numerals designate like or functionally equivalent parts, and in which:

FIG. 1 is a side view, partially in section, of cutting apparatus according to a preferred embodiment of the subject invention, with a cross-section through an object to be cut;

FIG. 2 is a view taken on the line 2—2 in FIG. 1, with a housing part removed for better visibility;

FIG. 5 is a side view similar to FIG. 1, on a reduced scale, showing the cutting apparatus on a mounting pole and in action, according to a preferred embodiment of the subject invention;

FIG. 6 is a view similar to FIG. 5, showing initiation of the cutting phase of the illustrated apparatus;

FIG. 7 is a view similar to FIGS. 5 and 6 showing the cutting phase of the illustrated apparatus.

DESCRIPTION OF PREFERRED EDBODIMENTS

Figure 3:
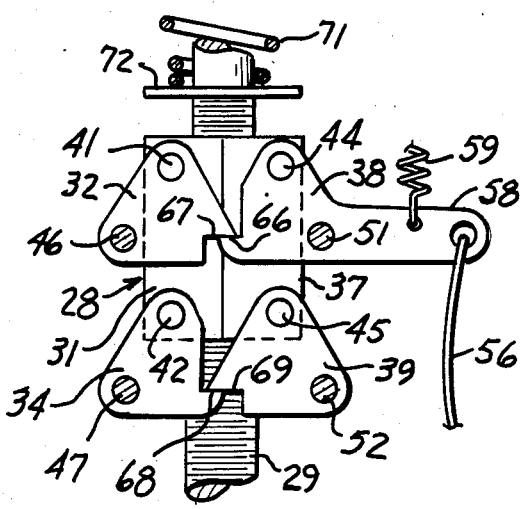
FIG. 3, is a view on an enlarged scale of part of the mechanism of the apparatus of FIG. 1, in a first position.

The main objective of the illustrated apparatus 10 is to cut a rod-like object 12, such as a branch or limb of a tree.

The illustrated cutting apparatus 10 has a housing or frame 13 provided with an extension 14 for suspending the apparatus from the object 12. The apparatus 10 also has a cutter 16 including a first cutting element 17 combined with the apparatus suspension extension 14, and a second element 18 complementing the first element for cutting the object 12. The apparatus 10 mounts the first and second elements 17 and 18 relative to each other for a reception of the object 12 therebetween. The apparatus 10 includes an actuator 20 for moving the first and second cutting elements toward each other and, in particular, for moving the first cutting element 17 into the object 12 and toward the second element 18, until that object 12 has been cut.

According to a preferred embodiment of the subject invention, the first cutting element 17 is formed as a hook 22 for suspending the cutter from the object 12 with that hook, which may be part of the suspension extension 14. The illustrated hook 22 is formed as a cutting blade 23. The second cutting element is formed as an anvil 25 as shown, for instance, in FIG. 2.

In the illustrated preferred embodiment of the invention, the cutter 16 is mounted on an elongate handle 26. If the object 12 is a tree branch or another object located remotely from a human operator, then the length of the handle 26 is at least such as to reach from the operator to any branch or other remote object to be cut within the apparatus 10. The handle may thus be considered a mounting pole for the apparatus 10.

The cutter actuator 20 includes a split nut 28 for receiving a threaded end 29 of the handle 26 in mating engagement therewith.

The split nut 28 has a first half 31 mounted relative to the apparatus frame 13 by linkage elements 32, 33, 34 and 35, and a second half 37 mounted relative to the frame 13 by four corresponding linkage elements, two of which are seen at 38 and 39 in FIG. 1.

The linkage elements 32 and 34 are coupled to the nut half 31 by pivot points 41 and 42 located at one side of the nut half 31. Corresponding pivot points are employed for coupling the linkage elements 33 and 35 to the other side of the first nut half 31.

Similarly, pivot points 44 and 45 are employed for coupling the linkage elements 38 and 39 to one side of the second nut half 37, and the same is true with respect to the linkage elements which are hidden from view in FIGS. 1 and 2, except that such further two linkage elements are coupled or pivoted to the other side of the second nut half 37.

Pivot shafts 46 and 47 extend between opposite sides 48 and 49 of the apparatus frame 13 for pivoting thereon the linkage elements 32, 33, 34 and 46, which are thus angularly movable relative to the frame 13. Similarly, shafts 51 and 52, extending between the lateral frame parts 48 and 49 in parallel to the shafts 46 and 57, are employed for pivoting the linkage elements 38 and 59 and their corresponding linkage elements, hidden from view in FIGS. 1 and 2, relative to the frame 13.

The split bushing 28 and the linkage elements 32, 33, 34, 35, 38, 39, etc. form part of a quick release mechanism 54 for releasing the second element 18 relative to the first cutting element 17.

The apparatus 10 includes or is equipped with an elongate member or rope 56 for actuating the quick release mechanism 54 of or for the second element 18 and for holding the first cutting element 17 onto the object 12, while the second element 18 is pushed with the handle 26 toward that object 12.

The rope 56 is attached to a lever 57 which is integral with the linkage element 38. A spring 59 biases the lever 58 and linkage plate 38 counterclockwise as seen in FIG. 1. The spring 59 is anchored to a transverse frame plate 61, which also acts as a side bearing for an unthreaded upper end 62 of the elongate handle 26 extending therethrough.

As shown in FIG. 3, the split nut 28 is closed against the threaded shaft section 29 by the spring 59, when the rope 56 is relaxed or released.

Figure 4:
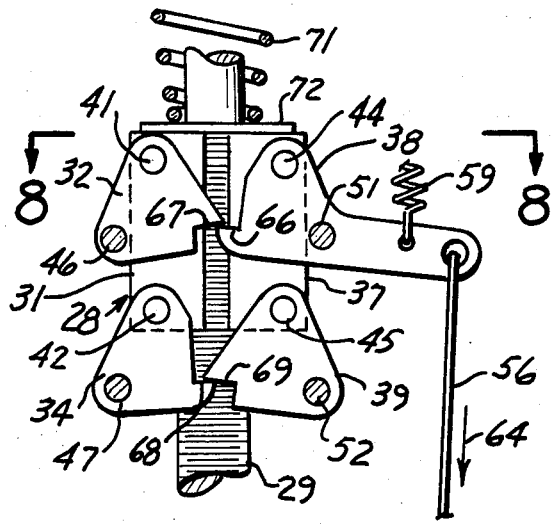
FIG. 4 is a view on an enlarged scale of part of the mechanism of the apparatus of FIG. 1, in a second position.
Figure 8:
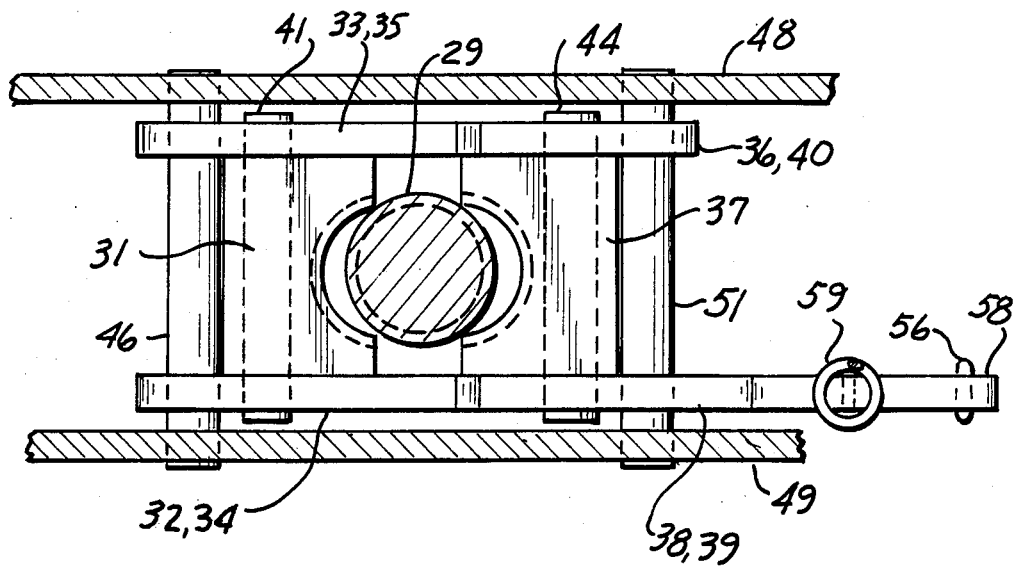
FIG. 8 is a section, on an enlarged scale, taken on the line 8—8 in FIG. 4.

On the other hand, the split nut halves 31 and 37 are moved in parallel away from the threaded shaft section 29 to the position shown in FIGS. 4 and 8 when the rope 56 is pulled downwardly in the direction of an arrow 64. In that case, a projection or tang 66 of the linkage element 38 pushes against a corresponding nose 67 of the linkage element 32, while there is a corresponding interaction between a tang 68 and nose 69 of linkage elements 34 and 39, respectively, because of the coupling via pivot points 41, 42, 44, and 45 and pivot shafts 46, 47, 51, and 52, described above in connection with FIGS. 1 to 4 and 8.

The split nut 28 is thus opened or released from threaded shaft section 29, as shown in FIGS. 4 and 8.

A spring 71 acts between the frame transverse plate 61 and a thrust washer 72 on top of the threaded handle portion 29. If the second member 18 has previously been moved toward the first member 17, the spring 71 returns the second element 18 toward the transverse plate 61 as shown in FIGS. 6 and 7, if the quick release mechanism is actuated as shown in FIGS. 4, 6, and 8.

The second element 18 is thus provided with a selectively actuable quick release action in a direction away from the first cutting element 17. That quick release action of the second element 18 may be actuated any time when it is desired to move the first and second cutting elements 17 and 18 away from each other, such as preparatory to or upon movement of the first cutting element 17 into the object 12.

In the operation of the cutting apparatus, the elongate handle 26 serves a moving of the first cutting element 17 or hook 22 onto the object 12 to be cut. To this end, the operator on the ground holds the handle 26 with one hand 74 and pulls the rope 56 downwardly with the other hand 75, as shown in FIG. 5. The operator then places the hook 22 over the object 12, which is thus received between the cutting elements 17 and 18. As shown in FIG. 6, the operator may then suspend the apparatus 10 from the object 12 with the first cutting element 17 or hook 22 and place the second element 18 or anvil 25 against the lower portion of the object 12.

To this end, the operator pulls the rope 56 downwardly with one hand 75, while pushing the handle 26 upwardly in the direction of the arrow 76 with the other hand 74. The rope 56 thus actuates the quick release action by opening the split nut 28 and holds the first cutting element 17 onto the object 12, while the second element 18 or anvil 25 is pushed with the handle 26 toward the object 12.

The first cutting element 17 or hook 22 is then moved relative to the rod-like object 12 via the handle 26.

As shown by an arrow 77 in FIG. 7 of the illustrated preferred embodiment, the handle 26 is rotated about a longitudinal axis 78 thereof. Preparatory to such rotary motion 77, the rope 56 is relaxed or released, so that the split bushing 28 is closed as shown in FIG. 3. In that closed position, the split bushing 28 and threaded shaft portion 29 interact for translating rotary motion of the handle 26 into movement of the first cutting element 17 or blade 23 into the object 12 and toward the second element 18 or anvil 25. Rotary motion of the second element 18 on top of the rotating shaft end 26 is avoided by means of a pin 79 projecting laterally from the second element 18 into a keyway in the frame extension 14.

In this manner, the first cutting element 17 or blade 23 is moved into the object 12 and toward the second element 18 or anvil 25 until the object 12 has been cut either completely, or sufficiently to break off by its own weight.

Since the subject invention places the first cutting element 17 or blade 23 on top of the object with respect to the natural force of gravity, the weight of the object 12 cannot pinch or wedge the blade 23 at all. Rather, the weight of the object will effect a progressive increase of the clearance at the blade 23, as the object is being cut.

During that cutting operation, the handle 26 and thereby the cutter 16 may be whipsawed back and forth relative to a longitudinal axis of the object, whereby the cutting action of the blade 23 is further increased. This is indicated by arrows 83 and 84 in FIG. 7.

If desired or necessary, the handle 26 may be provided with a lateral projection 81, with which the rotary force applied to the handle 26 may be increased many times by exterting a leverage on the laterally projecting portion 81 with the hand 74, for instance.

After the object 12 has been cut or has broken off at the cut inflicted by the cutter 16, quick release action of the second element 18 or anvil 25 may be effected by pulling the rope 56 downwardly, as seen in FIG. 5, for instance, whereby the spring 71 will move the cutting elements 17 and 18 away from each other. The apparatus 10 may then be carried away from the cutting site on the handle 26.

The subject extensive disclosure renders apparent or suggests to those skilled in the art various modifications and variations within the spirit and scope of the invention and equivalents thereof.

We claim:

1. A method of cutting a rod-like object, comprising in combination the steps of:

providing a cutter including a first cutting element formed as a hook for suspending said cutter from said object and a second element complementing said first cutting element for cutting said object;

mounting said cutter on an elongate handle;

providing said second element with a selectively actuable quick release action relative to said first cutting element;

providing an elongate member for actuating said quick release action of said second element and for holding said first cutting element onto said object, while said second element is pushed with said handle toward said object;

receiving said object between said first and second elements and suspending said cutter from said object with said hook and effecting said pushing of said second element toward said object;

rotating said handle about a longitudinal axis thereof;

translating rotary motion of said handle into movement of said first and second cutting elements toward each other; and moving said hook into said object suspending said cutter and toward said second element until said object has been cut.

2. A method as claimed in claim 1, including the step of:

effecting said quick release action to move said cutting elements away from each other after said object has been cut.

3. A method as claimed in claim 1, wherein:

said elongate handle is a mounting pole for said cutter.

4. A method as claimed in claim 3, including the step of:

moving said first cutting element relative to said rod-like object via said mounting pole.

5. A method as claimed in claim 3, including the step of:

rotating said mounting pole about a longitudinal axis thereof; and mounting said second element on top of said mounting pole.

6. A method as claimed in claim 1, including the steps of:

providing said second element as an anvil;

placing said anvil against said object; and moving said hook into said object and toward said anvil until said object has been cut.

7. A method as claimed in claim 1, including the steps of:

providing said second element as an anvil;
placing said anvil against said object while suspending said cutter including said first cutting element and said anvil from said rod-like object with said hook; and
moving said hook into said object and toward said anvil until said object has been cut.

8. A method as claimed in claim 1, including the steps of:
providing said second element as an anvil;
placing said anvil against said object via said handle; and
moving said anvil toward said hook via said handle.

9. A method as claimed in claim 1, wherein:
said second element is mounted on top of said handle.

10. A method as claimed in claim 9, wherein:
said hook is formed as a cutting blade.

11. A method as claimed in claim 1, wherein:
said hook is formed as a cutting blade.

12. A method as claimed in claim 9, including the steps of:
providing said an elongate member as a rope for actuating said quick release action of said second element and for holding said first cutting element onto said object, while said second element is pushed with said handle toward said object.

13. Apparatus for cutting a rod-like object, comprising in combination:
means for suspending said apparatus from said object;
cutting means including a first cutting element combined with said suspending means, a second element complementing said first element for cutting said object, means for mounting said first and second elements relative to each other for a reception of said object therebetween;
an elongate handle for supporting said cutting means;
said cutting means including means connected to first and second elements for mounting said handle for rotation about a longitudinal axis thereof, and means at said handle for translating rotary motion of said handle into movement of said first cutting element into said object and toward said second element until said object has been cut; and
a selectively actuable quick release mechanism for selectively releasing said second element relative to said first cutting element, including means for releasing said means for translating rotary motion and means for rendering said handle translatorily movable along said longitudinal axis relative to said release translating means, whereby said handle and said second element are manually movable along said longitudinal axis without rotation of said handle.

14. Apparatus as claimed in claim 13, including:
an elongate member connected to said selectively actuable quick release mechanism for selectively releasing said second element relative to said first cutting element.

15. Apparatus as claimed in claim 13, wherein:
said elongate handle is a mounting pole for said cutting means.

16. Apparatus as claimed in claim 13, wherein:
said first cutting element includes a cutting blade on said means for suspending said apparatus from said object.

17. Apparatus as claimed in claim 13, wherein:
said means for translating rotary motion of said handle into movement of the first cutting element into said object and toward said second element include a split nut for receiving a threaded shaft driven by said handle mounted for rotation about said longitudinal axis thereof; and
said quick release mechanism includes selectively actuable means for opening and releasing said split nut from said threaded shaft.

18. Apparatus as claimed in claim 13, wherein:
said second element is an anvil.

19. Apparatus for cutting a rod-like object, comprising in combination:
a hook for suspending said apparatus from said object;
cutting means including a first cutting element incorporated in said hook, a second element complementing said first element for cutting said object, means for mounting said first and second elements relative to each other for a reception of said object therebetween;
an elongate handle for supporting said cutter;
said cutting means including means connected to said first and second elements for mounting said handle for rotation about a longitudinal axis thereof, and means at said handle for translating rotary motion of said handle into movement of said first cutting element incorporated in said hook into said object and toward said second element until said object has been cut; and
a selectively actuable quick release mechanism for selectively releasing said second element relative to said first cutting element, including means for releasing said means for translating rotary motion and means for rendering said handle translatorily movable along said longitudinal axis relative to said released translating means, whereby said handle and said second element are manually movable along said longitudinal axis without rotation of said handle.

20. Apparatus as claimed in claim 19, wherein:
said second element is an anvil mounted on said elongate handle.

21. Apparatus as claimed in claim 19, wherein:
said first cutting element includes a cutting blade on said hook for suspending said cutter from said object.

22. Apparatus as claimed in claim 19, wherein:
said means for translating rotary motion of said handle into movement of said cutting element incorporated in said hook into said object and toward said second element include a split nut for receiving a threaded shaft driven by said handle mounted for rotation about said longitudinal axis thereof; and
said quick release mechanism includes selectively actuable means for opening and releasing said split nut from said threaded shaft.

23. Apparatus as claimed in claim 19, including:
an elongate member connected to said quick release mechanism for selectively releasing said second element and for holding said first cutting element onto said object, while said second element is pushed with said handle toward said object.

* * * * *